Figure 5:
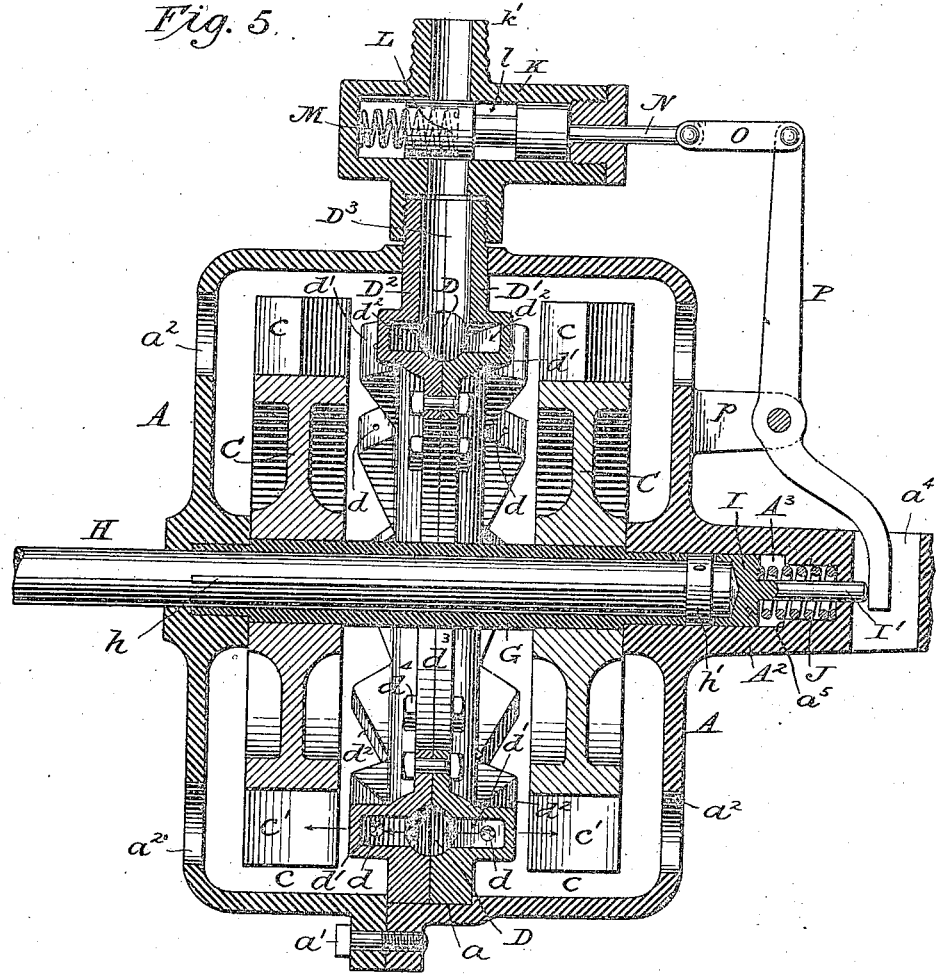

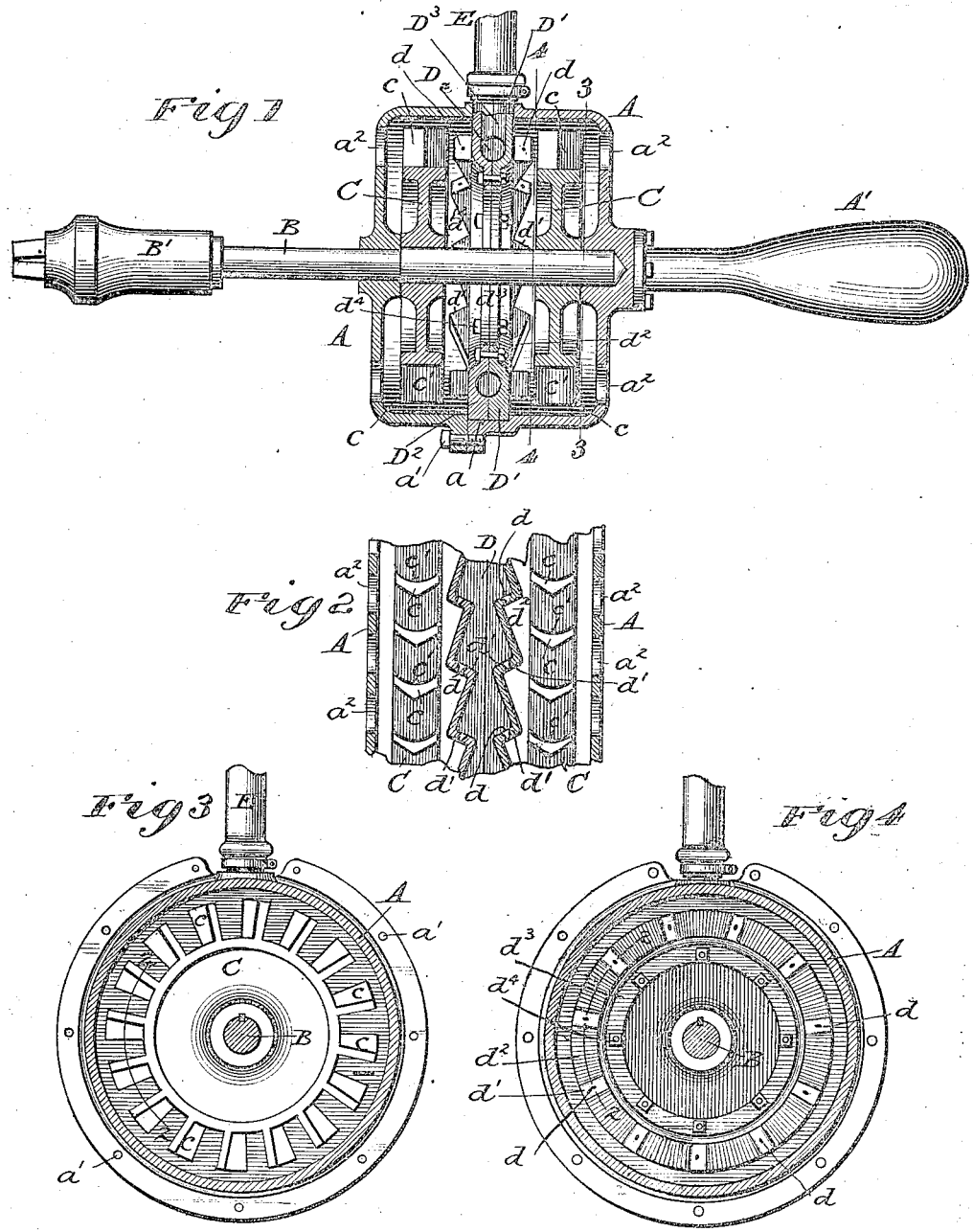

No. 764,498. PATENTED JULY 5, 1904.
C. C. POOLE.
PNEUMATIC TOOL.
APPLICATION FILED APR. 2, 1903.
NO MODEL.
2 SHEETS—SHEET 2.

Witnesses.

Inventor:
C. Clarence Poole,
by Poole & Brown
his Attorneys

No. 764,498. Patented July 5, 1904.

UNITED STATES PATENT OFFICE.

CHARLES CLARENCE POOLE, OF EVANSTON, ILLINOIS, ASSIGNOR TO MELVILLE E. DAYTON, OF WASHINGTON, DISTRICT OF COLUMBIA.

PNEUMATIC TOOL.

SPECIFICATION forming part of Letters Patent No. 764,498, dated July 5, 1904.

Application filed April 2, 1903. Serial No. 150,723. (No model.)

*To all whom it may concern:*

Be it known that I, CHARLES CLARENCE POOLE, of Evanston, in the county of Cook and State of Illinois, have invented certain new and useful Improvements in Pneumatic Tools; and I do hereby declare that the following is a full, clear, and exact description thereof, reference being had to the accompanying drawings, and to the letters of reference marked thereon, which form a part of this specification.

This invention relates to improvements in portable or hand pneumatic tools, and more especially to a tool of portable character embracing a motor having a rotative part operated by an impact of air moving at a great velocity, and is adapted to actuate a rotative drilling, cutting, or abrading tool, or other rotative tool of like character.

The invention consists in the matters hereinafter described, and pointed out in the appended claims.

In the accompanying drawings, Figure 1 is a view showing in longitudinal section the main operative parts of the pneumatic hand tool or drill, the tool-carrying spindle being shown in side elevation. Fig. 2 is a detail section taken through the rotative and non-rotative parts of the motor on the line 2 2 of Fig. 3. Fig. 3 is a cross-section taken on the line 3 3 of Fig. 1. Fig. 4 is a cross-section taken the line 4 4 of Fig. 1; and Fig. 5 is a sectional view through the motor part of the tool, illustrating a device for automatically controlling the supply of air to the motor.

As shown in the said drawings, A indicates a hollow casing, which constitutes the stock or frame of the implement and which is provided with a handle or handles by which the implement may be grasped and moved, the said casing being herein shown as provided with a single handle A'.

B indicates a tool-carrying spindle which is inserted at one end within and has rotative engagement with the casing A, said spindle being shown as provided at its ends with a tool holder or chuck B', adapted for receiving and holding a drill or like tool.

C C indicate two rotative disks which are rigidly attached to the spindle B inside of the casing A and which are located adjacent to the opposite end walls of said casing, said disks C C constituting the rotative members of the motor and being provided with marginal annularly-arranged radial blades or buckets $c$ $c$, which extend transversely across the marginal surfaces of the disks and which are provided with concave working faces $c'$ $c'$, which face rearwardly with respect to the direction of motion of the disks when the motor is in operation.

D indicates an annular air-tube which is mounted non-rotatively in the casing A between the blades or buckets $c$ $c$ on the disks C C and which is attached to or supported upon the casing A. Said annular tube D is provided on its opposite sides with annularly-arranged air-exit openings or jet-orifices $d$ $d$, said jet-orifices being directed obliquely with respect to the central axis of the tube and toward the concave faces $c'$ $c'$ of the buckets $c$ $c$. Air is supplied to said air-tube by means of the supply-pipe E, connected with one side of the same, and the air so supplied in making its exit from the said tube through the inclined jet-openings passes from said jet-openings in the form of oblique jets, which strike the concave faces of the buckets near the inner margin of the same and are deflected by said buckets laterally, outwardly, and rearwardly, these parts being arranged according to the principle of the well-known De Laval turbine, so that the kinetic energy due to the velocity of the air-jets in the impact of the latter against the curved surfaces of the buckets will operate to give rotative movement to said buckets and to the disks to which they are attached.

In order to enable the oblique jet-openings $d$ $d$ to be readily formed in the air-tube D, said air-tube is made into two laterally-separated parts or sections D' D², divided on a plane passing between the two opposite series of jet-openings, and each half or section is provided with a plurality of oblique walls $d'$ $d'$, arranged transversely of the tube in which said jet-openings are severally formed and which are arranged perpendicular to the central axes of said jet-openings. Said oblique walls $d'$ are joined by connecting inclined walls $d^2$, extending between the inner and outer margin of the transverse walls $d'$, said connecting-walls being generally parallel with the central axes of the jet-openings.

The transverse oblique walls $d'$ $d'$ arranged as described give a stepped or serrated form to the side faces of the air-tube. The air-tube thus made of two separated parts and having angular transverse walls arranged as described may be very readily constructed, because each side or half may be cast separately, and by reason of the inclined wall $d'$ being at right angles to the central axes of the jet-openings said jet-openings may readily and accurately be drilled or bored through the said walls at will and at the same time be of a form and shape most advantageous for the proper delivery of the air therethrough by reason of being perpendicular to the walls in which they are formed. To afford the best results in practice, the said jet-openings are made larger at their inner than at their outer ends, or are tapered from the inner surface of the tube outwardly, the making of the openings of this form being greatly facilitated by the making of the air-tube in two laterally-separated parts, because this construction enables the openings to be bored by a tool entering the wall of the tube at the inner surface thereof. The two halves or sections of the air-tube thus constructed may be connected in any suitable manner, the means shown for this purpose consisting of inwardly-extending flanges $d^3$ on the two sections, through which are inserted clamping-bolts $d^4$.

For supporting the annular tube D within the casing A said air-tube is shown as extending at its outer edge margin into contact with the cylindric side wall of the casing and as being fitted at such outer edge into an annular groove $a$, formed in the inner surface of said side wall.

For convenience in assembling and in separating the parts the casing A is shown as consisting of two separate halves or sections joined by means of bolts $a'$, the dividing-line between the sections extending through the groove $a$, so that the air-tube may be inserted in said groove and then clamped in place within the groove by the drawing together of the two parts or sections of the casing by the bolts $a'$.

The air-tube constructed as described is provided with a branch or neck $D^3$, which passes through an aperture in the side wall of the casing A and to which the air-supply tube E is connected. Said casing A is shown as provided in its end walls with an annular series of air-exit openings $a^2$, located opposite the buckets and through which the exhaust-air from the buckets may escape from the casing.

By reason of the location of the rotative members C C at opposite sides of the air-tube and the arrangement of the jet-openings at opposite sides of said air-tube any endwise pressure against its bearings of the rotative spindle B, to which the rotative members are attached, is prevented.

In Fig. 5 I have shown a construction in which the parts of the motor are like those before described, but in which the device is provided with means for cutting off the air-supply to the motor when the tool is not in use and for automatically admitting the air to the motor as soon as the tool is pressed against the work or object acted upon by said tool. In the form of tool illustrated the cut-off valve is operated by endwise movement of the tool-carrying spindle, which has yielding connection with the tool-casing, frame, or stock. In this instance the rotative members C C of the motor are mounted on a hollow tube or sleeve G, which is mounted and turned at its ends in bearing-apertures in the opposite end walls of the casing A, and a rotative spindle H is used for driving the tool, said spindle passing through the sleeve G and being connected therewith by a spline $h$ on the spindle engaging a groove in the sleeve, so that the spindle may move endwise to the sleeve, but is given rotative movement thereby. At the inner end of the spindle H the end wall of the casing A is provided with a central hub or extension $A^2$, in which is formed a cylindrical chamber $A^3$, forming an extension of the bearing-aperture for the inner end of the sleeve G. In said recess $A^3$ is located a sliding plug I, against the inner end of which the spindle H has endwise bearing, said spindle, as illustrated, having a conical end which enters a bearing aperture or recess formed in said plug I. To hold the spindle from outward movement in the sleeve G, the said spindle is provided with a detachable collar $h'$, located between the plug I and the inner end of said sleeve G and adapted to bear against the inner end of said sleeve. Within the recess $A^3$ is located a spring J, which acts on the plug I to throw the same toward the spindle and to hold the collar $h'$ on the spindle is normally in contact with the inner end of the sleeve G. Said plug I is provided with a stem $I'$, which projects through the end wall of the recess $A^3$ and enters a transverse opening or recess $a^4$ in the hub $A^2$.

Now referring to the parts adjacent to the supply-passage of the air-tube D, K indicates the casing of a piston-valve, and L the piston or valve-closure therein. Said valve-casing has a transverse tubular neck $k$, which is connected with the branch $D^3$ of the air-tube, and at its opposite side is a like neck $k'$, adapted for attachment thereto of a flexible air-supply pipe.

The casing K has a cylindrical bore or chamber at right angles to the necks $k$ $k'$, and on said bore or chamber is located the cylindric endwise-sliding piston L, which has between its ends an annular groove *l*, which when brought opposite the central passage of the valve affords communication between the air-supply pipe and the air-tube D. A coiled spring M, located between the inner end of said valve L and the casing K, tends to hold the said valve, with the groove *l*, away from the air-passages, and to thereby keep the valve closed. The valve-piston is provided with a stem N, which is connected, by a connecting-rod O, with a lever P, which lever is pivoted between its ends to lugs *p* on the casing A. The opposite end of said lever extends into the recess $a^4$ and is held in contact with the end of the stem I' by the action of the spring M on the valve-plug.

In the operation of this device when the tool is pressed against the work the tool-carrying spindle is moved or yields endwise with the plug I, against which it bears at its inner end, the spring J permitting the said plug I to slide backwardly in the casing. This movement of the plug is transmitted through the stem I', the lever P, and connecting-rod O to the valve L, so as to shift said valve into position to admit air to the motor. When the implement is not in use or when pressure upon the work is released, said spring J throws the plug I and the collar *h'* forwardly, thus throwing the valve L into its closed position and cutting off the air-supply to the motor. The movement of the plug I inwardly under the end thrust of the spindle is limited by a suitable stop, shown in the drawings as formed by a shoulder $a^5$ formed in the side wall of the recess $A^3$ and which faces toward the said plug.

It is to be understood that a device embodying the general principles of construction and operation present in the machine illustrated and described, and set forth in the claims, may be embodied in various mechanical forms, and my invention is not limited to the specific features of construction shown and described except as set forth in the appended claims.

I claim as my invention—

1. A pneumatic tool comprising a stock, a rotative tool-actuating spindle mounted on the stock and a pneumatic motor embracing a rotative disk which is mounted on the stock concentrically with the said spindle and having driving connection therewith, said disk being provided with radial buckets having concave working faces and an annular fixed air-tube mounted on the stock concentrically with said disk at one side of and out of contact with said buckets, said air-tube being provided with an annularly-arranged series of jet-openings arranged obliquely to the longitudinal axis of the tube and directed toward the concave faces of said buckets.

2. A pneumatic tool comprising a stock provided with a cylindric hollow casing, a tool-actuating spindle mounted in the end walls of and extending through said casing, and a pneumatic motor embracing two rotative disks mounted within the casing concentrically with the said spindle and having driving connection with the latter said disks being provided with an annularly-arranged series of radial buckets having concave working faces, and an annular air-tube affixed to the casing concentrically with said disks between the buckets thereon and out of contact with said buckets, said air-tube being provided on its opposite sides with annularly-arranged sets of jet-openings arranged obliquely to the central axis of the tube and directed toward the concave faces of the buckets.

3. A pneumatic motor comprising a rotative disk provided with annularly-arranged, radial buckets having concave working faces, and an annular non-rotative air-tube arranged concentrically with the said disk and provided with a plurality of annularly-arranged jet-orifices which are oblique to the central axis of the tube and are directed toward the concave faces of the buckets, said air-tube having a plurality of oblique, transverse flat walls through which said jet-openings severally extend.

4. A pneumatic motor comprising a rotative disk provided with annularly-arranged, radial buckets having concave working faces and an annular, non-rotative air-tube arranged concentrically with the disk and provided with a plurality of annularly-arranged jet-orifices which are oblique to the central axis of the tube and are directed toward the concave faces of the buckets, said air-tube being provided with a plurality of oblique, transverse walls through which said jet-openings severally extend, and interposed inclined connecting-walls, extending between the inner and outer margins of said oblique walls.

5. An annular air-tube for pneumatic motors provided in each of its opposite sides with a series of oblique jet-openings and with a series of transverse, oblique, flat walls through which the jet-orifices severally extend and which are perpendicular to the central axes of the jet-openings said tube consisting of two separate parts or sections which are divided longitudinally between the sets of jet-openings and are permanently joined to each other.

6. An annular air-tube for pneumatic motors provided in each of its opposite sides with a series of oblique jet-openings and with a series of transverse, oblique, flat walls, through which the said jet-openings extend and which are perpendicular to the central axes of the jet-openings and inclined connecting-walls extending between and connecting the inner and outer margins of said oblique walls, said tube consisting of two separate parts or sections which are divided longitudinally between the series of jet-openings and are permanently joined to each other.

7. A pneumatic tool comprising a cylindric casing, a rotative spindle which extends through and turns in the casing, two rotative disks arranged concentrically with said spindles and provided each with an annularly-arranged set of radial buckets having concave working faces, an air-tube supported on the casing between the sets of buckets on said disks, said air-tube having in each of its opposite sides a series of oblique jet-openings which are directed toward the concave faces of the buckets, the side walls of said air-tube consisting of a plurality of oblique flat walls through which the jet-openings severally extend and which are perpendicular to the central axes of said jet-openings and a series of inclined connecting-walls, giving serrated form to said side walls and said tube consisting of two separate parts or sections which are divided longitudinally between the said serrated side walls.

In testimony that I claim the foregoing as my invention I affix my signature, in presence of two witnesses, this 1st day of April, A. D. 1903.

CHARLES CLARENCE POOLE.

Witnesses:
C. A. NEALE,
B. L. CHADWELL.